United States Patent
Mabuchi

(10) Patent No.: US 8,164,231 B2
(45) Date of Patent: Apr. 24, 2012

(54) ELECTRET DEVICE COMPRISING ELECTRET FILM FORMED ON MAIN SURFACE OF SUBSTRATE AND ELECTROSTATIC OPERATING APPARATUS

(75) Inventor: Katsuji Mabuchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 444 days.

(21) Appl. No.: 11/936,542

(22) Filed: Nov. 7, 2007

(65) Prior Publication Data

US 2008/0111444 A1    May 15, 2008

(30) Foreign Application Priority Data

Nov. 10, 2006   (JP) .................................. 2006-305615
Oct. 15, 2007   (JP) .................................. 2007-268195

(51) Int. Cl.
*H02N 1/00* (2006.01)
(52) U.S. Cl. ...................................................... 310/309
(58) Field of Classification Search .................. 310/309; 381/191; 307/400; 29/886
See application file for complete search history.

(56) References Cited

U.S. PATENT DOCUMENTS

| | | | | |
|---|---|---|---|---|
| 5,544,001 A * | 8/1996 | Ichiya et al. | ................. | 361/233 |
| 6,833,687 B2 * | 12/2004 | Landolt | ........................ | 320/166 |
| 7,449,811 B2 * | 11/2008 | Suzuki et al. | ................. | 310/309 |
| 7,525,205 B2 * | 4/2009 | Mabuchi et al. | ............. | 290/1 R |
| 2006/0113862 A1 | 6/2006 | Suzuki et al. | | |
| 2008/0048521 A1 * | 2/2008 | Mabuchi et al. | ............. | 310/309 |
| 2008/0111444 A1 * | 5/2008 | Mabuchi | ....................... | 310/309 |
| 2008/0122313 A1 * | 5/2008 | Mabuchi et al. | ............. | 310/309 |
| 2008/0258565 A1 * | 10/2008 | Murayama et al. | ........... | 307/400 |

FOREIGN PATENT DOCUMENTS

| | | | |
|---|---|---|---|
| JP | 02-052599 A | | 2/1990 |
| JP | 02219478 | * | 9/1990 |
| JP | 07-014490 A | | 1/1995 |
| JP | 9-283374 | | 10/1997 |
| JP | 62-297779 | * | 12/1997 |
| JP | 11-219851 | | 8/1999 |
| JP | 11-219852 | | 8/1999 |
| JP | 2002-102625 A | | 4/2002 |
| JP | 2006-180450 | | 7/2006 |
| JP | 2008-021787 A | | 1/2008 |

OTHER PUBLICATIONS

Machine Translation of JP 07-14490, Mitsuo Ichiya et al., "Electrostatic Actuating Relay", Jan. 17, 1995.*
Manual Translation of "electret generator", Seiichi Iwamatsu, Sep. 3, 1990, JP 02219478.*
Japanese Office Action, 2007-268195, Nov. 18, 2008, pp. 1-9, Japan.
Japanese Office Action for corresponding JP Application No. 2007-268195, dated Sep. 8, 2009, pp. 1-7, Japan.

* cited by examiner

*Primary Examiner* — Karl Tamai
(74) *Attorney, Agent, or Firm* — Ditthavong Mori & Steiner, P.C.

(57) ABSTRACT

An electret device includes a substrate formed with a plurality of recess portions on a main surface thereof and an electret film so formed on the main surface of the substrate as to cover at least inner surfaces of the recess portions.

10 Claims, 11 Drawing Sheets

ELECTRET DEVICE COMPRISING ELECTRET FILM FORMED ON MAIN SURFACE OF SUBSTRATE AND ELECTROSTATIC OPERATING APPARATUS

CROSS-REFERENCE TO RELATED APPLICATIONS

The priority application numbers JP2006-305615, Electret Device and Electrostatic Induction Conversion Device, Nov. 10, 2006, Katsuji Mabuchi, JP2007-268195, Electret Device and Electrostatic Operating Apparatus, Oct. 15, 2007, Katsuji Mabuchi, upon which this patent application is based are hereby incorporated by reference.

BACKGROUND OF THE INVENTION

1. Field of the Invention

The present invention relates to an electret device and an electrostatic operating apparatus, and more particularly, it relates to an electret device comprising an electret film formed on a main surface of a substrate and an electrostatic operating apparatus comprising the electret device.

2. Description of the Background Art

An electret device comprising an electret film formed on a main surface of a substrate is known in general. As the conventional electret device, an electret device with an electret film flatly formed on a main surface of a flat substrate is disclosed. In this conventional electret device, charges are injected into a flat silicon oxide film by thermal oxidation, thereby forming the flat electret film.

SUMMARY OF THE INVENTION

An electret device according to a first aspect of the present invention comprises a substrate formed with a plurality of recess portions on a main surface thereof and an electret film so formed on the main surface of the substrate as to cover at least inner surfaces of the recess portions.

An electrostatic operating apparatus according to a second aspect of the present invention comprises an electrode and an electret device so provided as to be opposed to the electrode at a prescribed distance, and including a substrate formed with a plurality of recess portions on a main surface thereof and an electret film so formed on the main surface of the substrate as to cover at least inner surfaces of the recess portions, wherein the electrode and the electret device are relatively movable with each other.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the drawings.

First Embodiment

A structure of an electret device 10 according to a first embodiment of the present invention will be now described with reference to FIG. 1.

Figure 1:
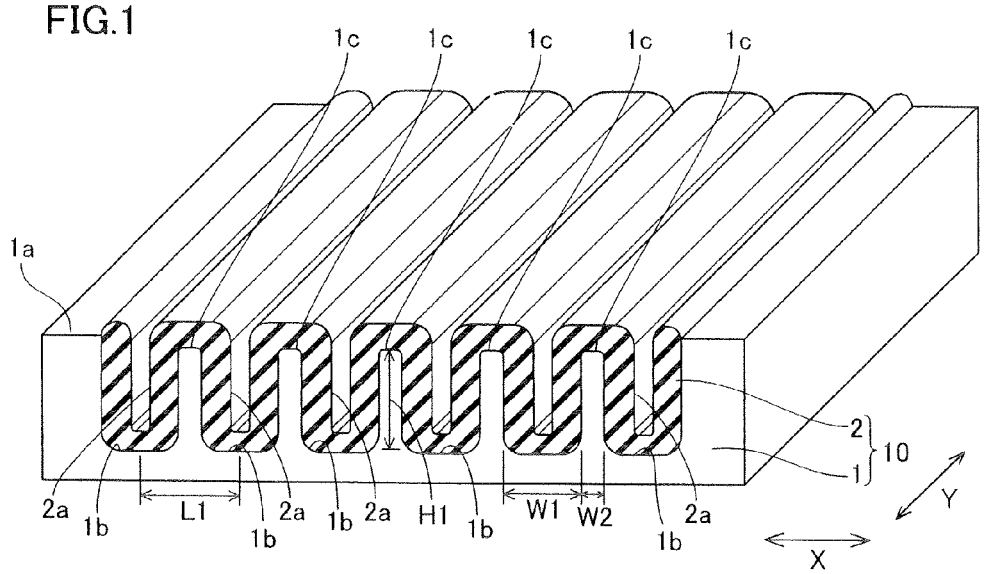
FIG. 1 is a perspective view showing a structure of an electret device according to a first embodiment of the present invention.

This electret device 10 according to the first embodiment is constituted by a silicon substrate 1 and an electret film 2 of silicon oxide by thermal oxidation capable of storing negative charges, as shown in FIG. 1.

According to the first embodiment, a plurality of grooves 1b are formed on a main surface 1a of the silicon substrate 1 of the electret device 10 at prescribed intervals (distance between centers) L1 (about 10 µm, for example) along arrow X. The grooves 1b are examples of the "recess portions" in the present invention. The grooves 1b are formed such that a depth H1 is larger that a width W1. More specifically, the grooves 1b each are so formed as to have the depth H1 of about 15 µm and the width W1 of about 8 µm. The grooves 1b are so formed as to extend along arrow Y. Thus, projection shaped portions 1c each having a width W2 of about 2 µm are so formed as to protrude from bottom surfaces of the grooves 1b between the adjacent grooves 1b. The projection shaped portions 1c are examples of "projecting portions" in the present invention. The electret film 2 of silicon oxide by thermal oxidation having a thickness of about 2 µm is so formed on the main surface 1a of the silicon substrate 1 as to cover inner surfaces of the grooves 1b and surfaces of the projection shaped portions 1c between the grooves 1b. The electret film 2 is formed such that the thickness of the electret film 2 is smaller than the depth H1 of each groove 1b. The electret film 2 of silicon oxide by thermal oxidation is so formed as to reflect shapes of the grooves 1b and the projection shaped portions 1c. In other words, portions formed in the grooves 1b of the electret film 2 of silicon oxide by thermal oxidation are so formed as to have groove shaped portions 2a. The groove shaped portions 2a each are so formed as to have a depth of about 15 µm and a width of about 4 µm and extend along arrow Y.

A manufacturing process of the electret device 10 according to the first embodiment of the present invention will be now described with reference to FIGS. 1 and 2.

Figure 2:
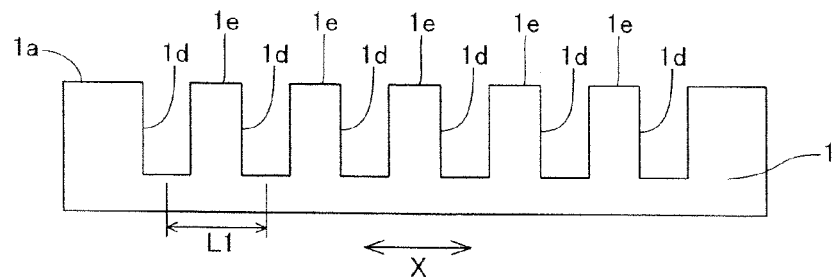
FIG. 2 is a sectional view for illustrating a process of manufacturing the electret device according to the first embodiment of the present invention.

As shown in FIG. 2, a plurality of grooves 1d are formed on the main surface 1a of the silicon substrate 1 by photolithography and etching at prescribed intervals (distance between centers) L1 (about 10 µm, for example) along arrow X. These grooves 1d each have a depth of about 15 µm and a width of about 6 µm. Thus, projection shaped portions 1e each having a width of about 4 µm are formed between the adjacent grooves 1d. Then inner surfaces of the grooves 1d of the silicon substrate 1 and upper surfaces of the projection shaped portions 1e between the grooves 1d are thermally oxidized by thermal oxidation, thereby forming a silicon oxide film having a thickness of about 2 µm. This thermal oxidation is performed by thermal treatment at about 1000° C. for 15 hours in an atmosphere containing hydrogen gas, nitrogen gas and oxygen gas. Thus, the grooves 1b (see FIG. 1) each having the width W1 (about 8 µm) larger than that of the grooves 1d shown in FIG. 2 are formed and the projection shaped portions 1c (see FIG. 1) each having a width W2 (about 2 µm) smaller than that of the projection shaped portions 1e shown in FIG. 2 are formed.

Thereafter energy due to an electric field is given to negative charges generated by corona discharge, whereby the negative charges are injected into the silicon oxide film. Thus, the electret film 2 as shown in FIG. 1 is formed.

According to the first embodiment, as hereinabove described, the silicon oxide film is formed on the main surface 1a of the silicon substrate 1 formed with the grooves 1d by thermal oxidation, whereby the silicon oxide film can be so formed as to cover the inner surfaces of the grooves 1b of the silicon substrate 1. Thus, the silicon oxide film by thermal oxidation can be formed not only from bottom surface portions of the grooves 1b in a direction perpendicular to the main surface 1a of the silicon substrate 1 but also from inner side surface portions of the grooves 1b in a horizontal direction with respect to the main surface 1a of the silicon substrate 1, and hence the surface area (volume) per unit plane area of the silicon oxide film can be increased. Consequently, the electret film 2 of silicon oxide is formed by injecting negative charges into the silicon oxide film with the increased surface area (volume) per unit plane area, whereby the surface potential of the electret film 2 of silicon oxide can be increased.

According to the first embodiment, the depth H1 of each groove 1b is so formed as to be larger than the thickness of the electret film 2, whereby the thickness of the electret film 2 formed on the bottom surface portion of each groove 1b in the direction perpendicular to the main surface 1a of the silicon substrate 1 can be regarded to be larger than the thickness of the electret film 2 formed on each protruding portion 1c of the silicon substrate 1, as viewed from a section. In other words, the electret film 2 having a larger thickness can be formed on positions where the grooves 1b are formed. The depth H1 of each groove 1b is so formed as to be larger than the width W1 of each groove 1b, whereby the thickness of the electret film 2 in the grooves 1b can be increased as compared with a case where the width W1 of each groove 1b is larger than the depth H1 of each groove 1b. When the electret film 2 formed on the silicon substrate 1 is etched for processing to have a prescribed shape, only portions formed on the main surface 1a of the silicon substrate 1 each having a smaller thickness than portions formed in the grooves 1b are etched and hence the time for etching can be reduced. Therefore, the electret film 2 can be inhibited from being removed beyond necessity due to long etching time.

Figure 3:
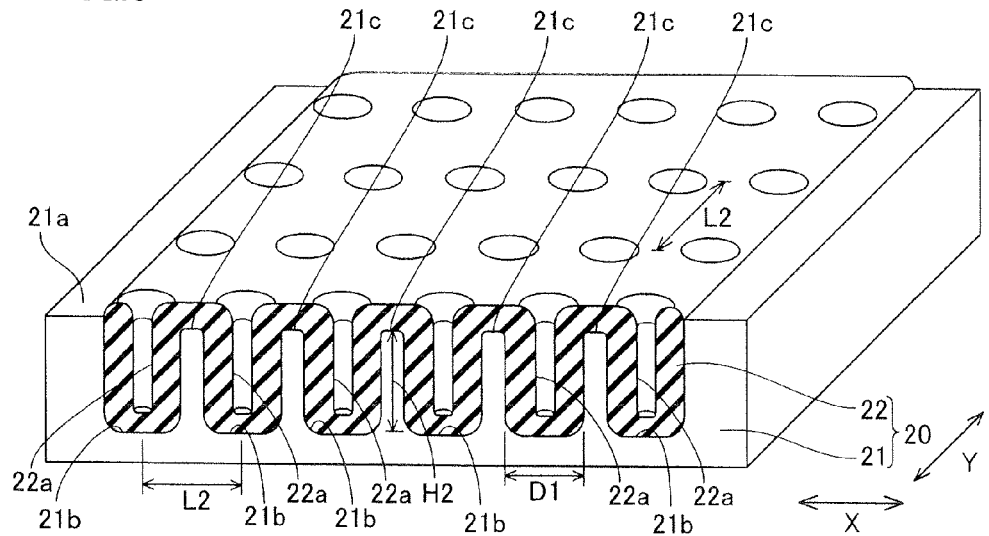
FIG. 3 is a sectional view showing a structure of an electret device according to a modification of the first embodiment of the present invention.

Referring to FIG. 3, an electret device 20 according to a modification of the first embodiment has a structure in which holes 21b are formed on a main surface 21a of a silicon substrate 21, dissimilarly to the electret device according to the first embodiment shown in FIG. 1.

The electret device 20 according to the modification of the first embodiment is constituted by the silicon substrate 21, an electret film 22 of silicon oxide by thermal oxidation capable of storing negative charges as shown in FIG. 3.

According to the modification of the first embodiment, a plurality of the circular holes 21b in plan view are formed on the main surface 21a of the silicon substrate 21 of the electret device 20 at the same intervals (distance between centers) L2 (about 10 µm, for example) along arrows X and Y. The holes 21b are examples of the "recess portions" in the present invention. The holes 21b are formed such that a depth H2 is larger that a diameter D1. More specifically, the holes each are so formed as to have the depth H2 of about 15 µm and a diameter D1 of about 8 µm in plan view. Thus, projection shaped portions 21c are so formed as to protrude from bottom surfaces of the holes 21b between the adjacent holes 21b. The projection shaped portions 21c are examples of "projecting portions" in the present invention. The electret film 22 of silicon oxide by thermal oxidation having a thickness of about 2 µm is so formed on the main surface 21a of the silicon substrate 21 as to cover inner surfaces of the holes 21b and surfaces of the projection shaped portions 21c between the holes 21b. The electret film 22 is formed such that the thickness of the electret film 22 is smaller than the depth H1 of each hole 21b. The electret film 22 of silicon oxide by thermal oxidation is so formed as to reflect shapes of the holes 21b and the projection shaped portions 21c. In other words, portions formed in the holes 21b of the electret film 22 of silicon oxide by thermal oxidation are so formed as to have hole shaped portions 22a. The hole shaped portions 22a each are so formed as to have a depth of about 15 µm and a diameter of about 4 µm in plan view.

A manufacturing process of the electret device 20 according to the modification of the first embodiment shown in FIG.

3 is similar to that of the aforementioned first embodiment except a forming process of the holes 21b. The holes each having a depth of about 15 μm and a diameter of about 6 μm in plan view are formed on the main surface 21a of the silicon substrate 21 by photolithography and etching and thereafter a silicon oxide film is formed on the main surface 21a of the silicon substrate 21 by thermal oxidation, thereby forming the holes 21b. Thus, the holes 21b each having the diameter D1 (about 8 μm) larger than that of each hole formed by photolithography and etching are formed.

According to the modification of the first embodiment, as hereinabove described, the silicon oxide film is formed on the main surface 21a of the silicon substrate 21 formed with the holes by thermal oxidation, whereby the silicon oxide film can be so formed as to cover the inner surfaces of the holes 21b of the silicon substrate 21. Thus, the silicon oxide film by thermal oxidation can be formed not only from bottom surface portions of the holes 21b in a direction perpendicular to the main surface 21a of the silicon substrate 21 but also from inner peripheral surface portions of the holes 21b in a horizontal direction with respect to the main surface 21a of the silicon substrate 21, and hence the surface area (volume) per unit plane area of the silicon oxide film can be increased. Consequently, the electret film 22 of silicon oxide is formed by injecting negative charges into the silicon oxide film with the increased surface area (volume) per unit plane area, whereby the surface potential of the electret film 22 of silicon oxide can be increased.

According to the modification of the first embodiment, the depth H2 of each hole 21b is so formed as to be larger than the thickness of the electret film 22, whereby the thickness of the electret film 22 formed on the bottom surface portion of each hole 21b in the direction perpendicular to the main surface 21a of the silicon substrate 21 can be regarded to be larger than the thickness of the electret film 22 formed on each protruding portion 21c of the silicon substrate 21, as viewed from a section. In other words, the electret film 22 having a larger thickness can be formed on positions where the holes 21b are formed. The depth H2 of each hole 21b is so formed as to be larger than the diameter D1 of each hole 21b, whereby the thickness of the electret film 22 in the grooves 21b can be increased as compared with a case where the diameter D1 of each hole 21b is larger than the depth H2 of each hole 21b. When the electret film 22 formed on the silicon substrate 21 is etched for processing to have a prescribed shape, only portions formed on the main surface 21a of the silicon substrate 21 each having a smaller thickness than portions formed in the holes 21b are etched and hence the time for etching can be reduced. Therefore, the electret film 22 can be inhibited from being removed beyond necessity due to long etching time.

Second Embodiment

Figure 4:
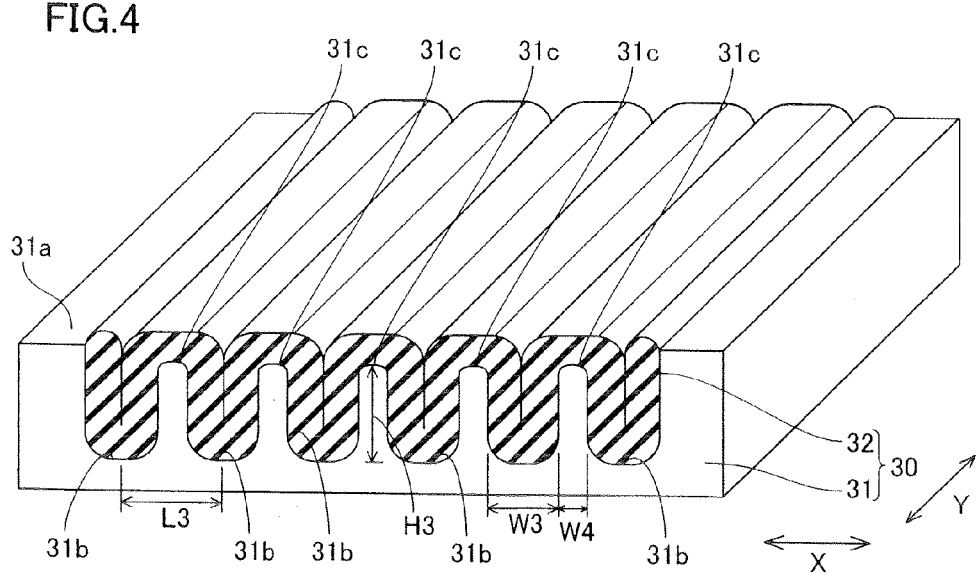
FIG. 4 is a perspective view showing a structure of an electret device according to a second embodiment of the present invention.

Referring to FIG. 4, an electret device 30 according to a second embodiment has a structure in which an electret film 32 of silicon oxide fills up grooves 31b, dissimilarly to the electret device according to the aforementioned first embodiment.

This electret device 30 according to the second embodiment is constituted by a silicon substrate 31 and the electret film 32 of silicon oxide by thermal oxidation capable of storing negative charges, as shown in FIG. 4

According to the second embodiment, a plurality of grooves 31b are formed on a main surface 31a of the silicon substrate 31 of the electret device 30 at prescribed intervals (distance between centers) L3 (about 10 μm, for example) along arrow X. The grooves 31b are examples of the "recess portions" in the present invention. The grooves 31b are formed such that a depth H3 is larger that a width W3. More specifically, the grooves 31b each are so formed as to have the depth H3 of about 15 μm and the width W3 of about 4 μm. The grooves 31b are so formed as to extend along arrow Y. Thus, projection shaped portions 31c each having a width W4 of about 6 μm are so formed as to protrude from bottom surfaces of the grooves 1b between the adjacent grooves 31b. The projection shaped portions 1c are examples of "projecting portions" in the present invention. The electret film 32 of silicon oxide by thermal oxidation having a thickness of about 2 μm is so formed on the main surface 31a of the silicon substrate 31 as to cover inner surfaces of the grooves 31b and surfaces of the projection shaped portions 31c between the grooves 31b. The electret film 32 is formed such that the thickness of the electret film 32 is smaller than the depth H3 of each groove 31b. The electret film 32 of silicon oxide by thermal oxidation is so formed as to fill up the grooves 31b.

A manufacturing process of the electret device 30 according to the second embodiment of the present invention will be now described with reference to FIGS. 4 and 5.

Figure 5:
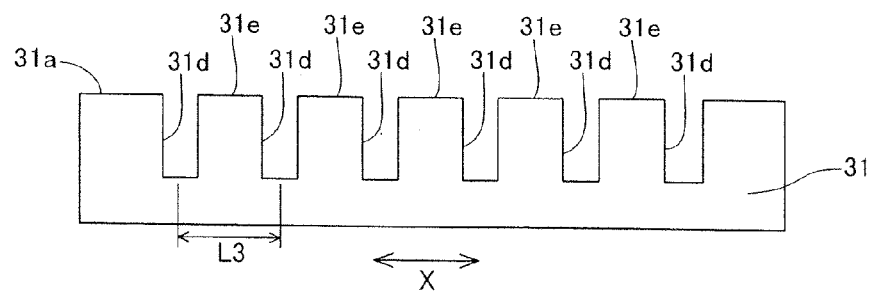
FIG. 5 is a sectional view for illustrating a process of manufacturing the electret device according to the second embodiment of the present invention.

As shown in FIG. 5, a plurality of grooves 31d are formed on the main surface 31a of the silicon substrate 31 by photolithography and etching at prescribed intervals (distance between centers) L3 (about 10 μm, for example) along arrow X. These grooves 31d each have a depth of about 15 μm and a width of about 2 μm. Thus, projection shaped portions 31e each having a width of about 8 μm are formed between the adjacent grooves 31d. Then inner surfaces of the grooves 31d of the silicon substrate 31 and upper surfaces of the projection shaped portions 31e between the grooves 31d are thermally oxidized by thermal oxidation, thereby forming a silicon oxide film having a thickness of about 2 μm. This thermal oxidation is performed by thermal treatment at about 1000° C. for 15 hours in an atmosphere containing hydrogen gas, nitrogen gas and oxygen gas. Thus, the grooves 31b (see FIG. 4) each having the width W3 (about 4 μm) larger than that of the grooves 31d shown in FIG. 5 are formed and the projection shaped portions 31c (see FIG. 4) each having a width W4 (about 6 μm) smaller than that of the projection shaped portions 31e shown in FIG. 5 are formed. According to the second embodiment, the width of each groove 31d is smaller than that of each groove 1d according to the aforementioned first embodiment, whereby the silicon oxide film by thermal oxidation is so formed as to fill up the grooves 31b.

Thereafter energy due to an electric field is given to negative charges generated by corona discharge, whereby the negative charges are injected into the silicon oxide film. Thus, the electret film 32 as shown in FIG. 4 is formed.

According to the second embodiment, as hereinabove described, the silicon oxide film is formed on the main surface 31a of the silicon substrate 31 formed with the grooves 31d by thermal oxidation, whereby the silicon oxide film can be so formed as to fill up the grooves 31b of the silicon substrate 31. Thus, the thickness of the silicon oxide film can be partially increased, and hence the volume per unit plane area of the silicon oxide film can be increased. Consequently, the electret film 32 of silicon oxide is formed by injecting negative charges into the silicon oxide film with the increased volume per unit plane area, whereby the surface potential of the electret film 32 of silicon oxide can be increased.

According to the second embodiment, the depth H3 of each groove 31b is so formed as to be larger than the thickness of the electret film 32, whereby the thickness of the electret film 32 formed on the bottom surface portion of each groove 31b in the direction perpendicular to the main surface 31a of the silicon substrate 31 can be regarded to be larger than the thickness of the electret film 32 formed on each protruding portion 31c of the silicon substrate 31, as viewed from a section. In other words, the electret film 32 having a larger thickness can be formed on positions where the grooves 31b are formed. The depth H3 of each groove 31b is so formed as to be larger than the width W3 of each groove 31b, whereby the thickness of the electret film 32 in the grooves 31b can be increased as compared with a case where the width W3 of each groove 31b is larger than the depth H3 of each groove 31b. When the electret film 32 formed on the silicon substrate 31 is etched for processing to have a prescribed shape, only portions formed on the main surface 31a of the silicon substrate 31 each having a smaller thickness than portions formed in the grooves 31b are etched and hence the time for etching can be reduced. Therefore, the electret film 32 can be inhibited from being removed beyond necessity due to long etching time.

Figure 6:
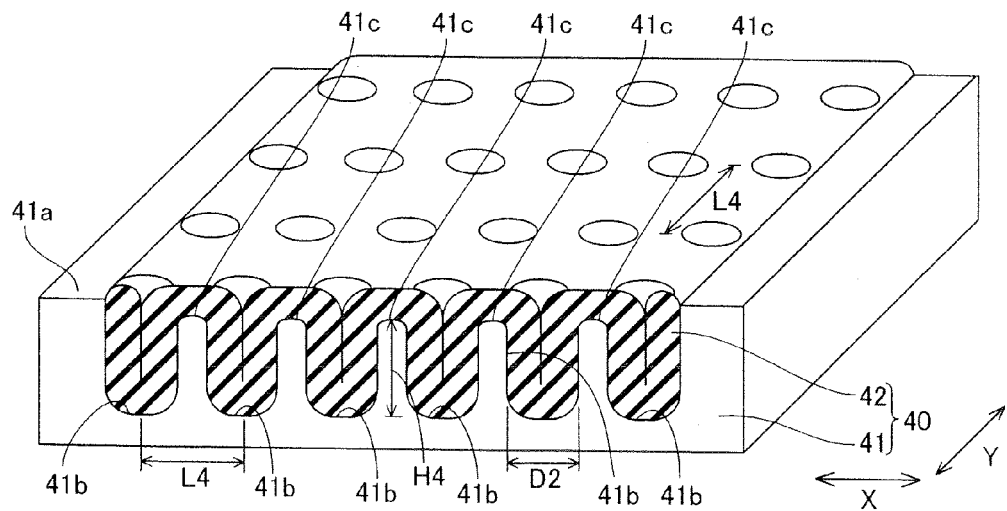
FIG. 6 is a sectional view showing a structure of an electret device according to a modification of the second embodiment of the present invention.

Referring to FIG. 6, an electret device 40 according to a modification of the second embodiment has a structure in which holes 41b are formed on a main surface 41a of a silicon substrate 41, dissimilarly to the electret device according to the second embodiment shown in FIG. 4.

The electret device 40 according to the modification of the second embodiment is constituted by the silicon substrate 41, an electret film 42 of silicon oxide by thermal oxidation capable of storing negative charges as shown in FIG. 6.

According to the modification of the second embodiment, a plurality of the circular holes 41b in plan view are formed on the main surface 41a of the silicon substrate 41 of the electret device 40 at the same intervals (distance between centers) L4 (about 10 μm, for example) along arrows X and Y. The holes 41b are examples of the "recess portions" in the present invention. The holes 41b are formed such that a depth H4 is larger that a diameter D2. More specifically, the holes each are so formed as to have the depth H4 of about 15 μm and a diameter D2 of about 4 μm in plan view. Thus, projection shaped portions 41c are so formed as to protrude from bottom surfaces of the holes 41b between the adjacent holes 41b. The projection shaped portions 41c are examples of "projecting portions" in the present invention. The electret film 42 of silicon oxide by thermal oxidation having a thickness of about 2 μm is so formed on the main surface 41a of the silicon substrate 41 as to cover inner surfaces of the holes 41b and surfaces of the projection shaped portions 41c between the holes 41b. The electret film 42 is formed such that the thickness of the electret film 42 is smaller than the depth H4 of each hole 41b. The electret film 42 is so formed as to fill up the holes 41b.

A manufacturing process of the electret device 40 according to the modification of the second embodiment shown in FIG. 6 is similar to that of the aforementioned second embodiment except a forming process of the holes 41b. The holes each having a depth of about 15 μm and a width of about 2 μm in plan view are formed on the main surface 41a of the silicon substrate 41 by photolithography and etching and thereafter a silicon oxide film is formed on the main surface 41a of the silicon substrate 41 by thermal oxidation, thereby forming the holes 41b. Thus, the holes 41b each having the diameter D2 (about 4 μm) larger than that of each holes formed by photolithography and etching are formed.

According to the modification of the second embodiment, as hereinabove described, the silicon oxide film is formed on the main surface 41a of the silicon substrate 41 formed with the holes by thermal oxidation, whereby the silicon oxide film can be so formed as to fill up the holes 41b of the silicon substrate 41. Thus, the thickness of the silicon oxide film can be partially increased, and hence the volume per unit plane area of the silicon oxide film can be increased. Consequently, the electret film 42 of silicon oxide is formed by injecting negative charges into the silicon oxide film with the increased volume per unit plane area, whereby the surface potential of the electret film 42 of silicon oxide can be increased.

According to the modification of the second embodiment, the depth H4 of each hole 41b is so formed as to be larger than the thickness of the electret film 42, whereby the thickness of the electret film 42 formed on the bottom surface portion of each hole 41b in the direction perpendicular to the main surface 41a of the silicon substrate 41 can be regarded to be larger than the thickness of the electret film 42 formed on each protruding portion 41c of the silicon substrate 41, as viewed from a section. In other words, the electret film 42 having a larger thickness can be formed on positions where the holes 41b are formed. The depth H4 of each hole 41b is so formed as to be larger than the diameter D2 of each hole 41b, whereby the thickness of the electret film 42 in the grooves 41b can be increased as compared with a case where the diameter D2 of each hole 41b is larger than the depth H4 of each hole 41b. When the electret film 42 formed on the silicon substrate 41 is etched for processing to have a prescribed shape, only portions formed on the main surface 41a of the silicon substrate 41 each having a smaller thickness than portions formed in the holes 41b are etched and hence the time for etching can be reduced. Therefore, the electret film 42 can be inhibited from being removed beyond necessity due to long etching time.

Third Embodiment

Figure 7:
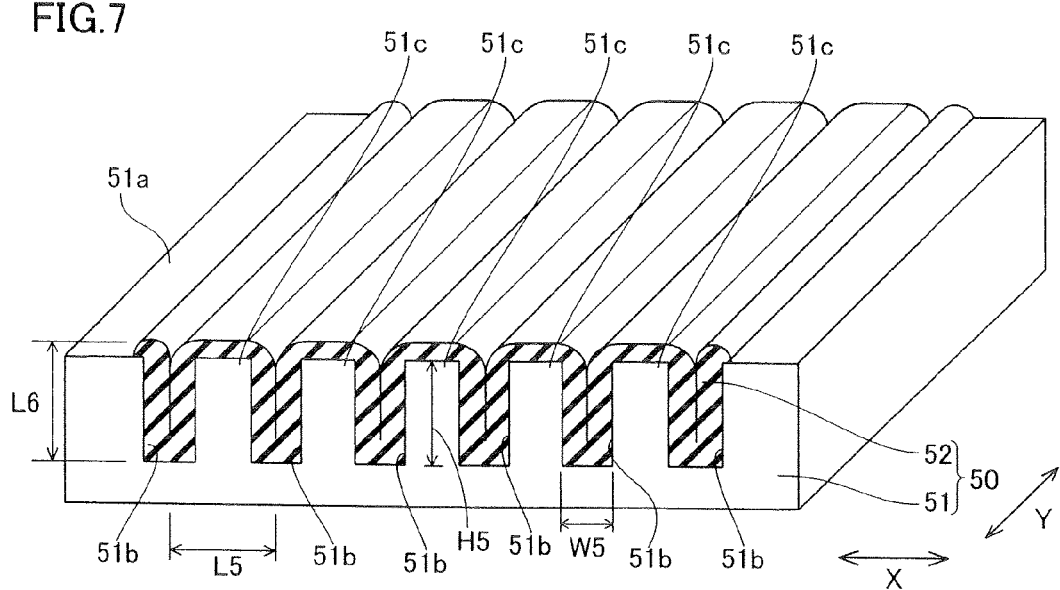
FIG. 7 is a perspective view showing a structure of an electret device according to a third embodiment of the present invention.

Referring to FIG. 7, in an electret device according to a third embodiment, an electret film of an inorganic material (HDP-SiO$_2$) other than thermal silicon oxide is formed by plasma CVD, dissimilarly to the electret device including the electret film of silicon oxide formed by thermal oxidation according to each of the first and second embodiments. More specifically, according to the third embodiment, an electret film 52 of HDP-SiO$_2$ (high density plasma oxide film) as the exemplary inorganic material is formed.

An electret device 50 according to the third embodiment is constituted by a silicon substrate 51 and the electret film 52 of HDP-SiO$_2$ capable of storing negative charges formed by plasma CVD as shown in FIG. 7.

A plurality of grooves 51b each having a depth H5 of about 5 μm and a width W5 of about 3 μm are formed on the silicon substrate 51 at prescribed intervals (distance between centers) L5 (about 10 μm, for example). The electret film 52 of HDP-SiO$_2$ having a thickness of about 2 μm is so formed on a main surface 51a of the silicon substrate 51 as to cover inner surfaces of the grooves 51b and projection shaped portions 51c between the grooves 51b and is so formed as to fill up the grooves 51b. Thus, the electret film 52 is constituted such that a thickness L6 of the electret film 52 in each groove 51b is substantially about 7 μm.

The remaining structure of the electret device according to the third embodiment is similar to that of the electret device according to the second embodiment.

A manufacturing process of the electret device 50 according to the third embodiment of the present invention will be now described with reference to FIGS. 7 to 9.

Figure 8:
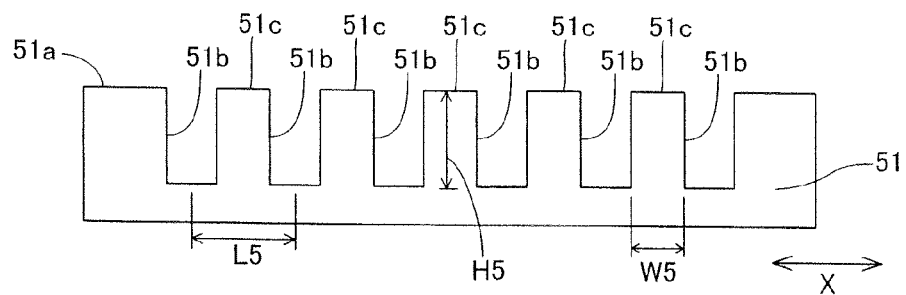
FIGS. 8 and 9 are sectional views for illustrating a process of manufacturing the electret device according to the third embodiment of the present invention.
Figure 9:
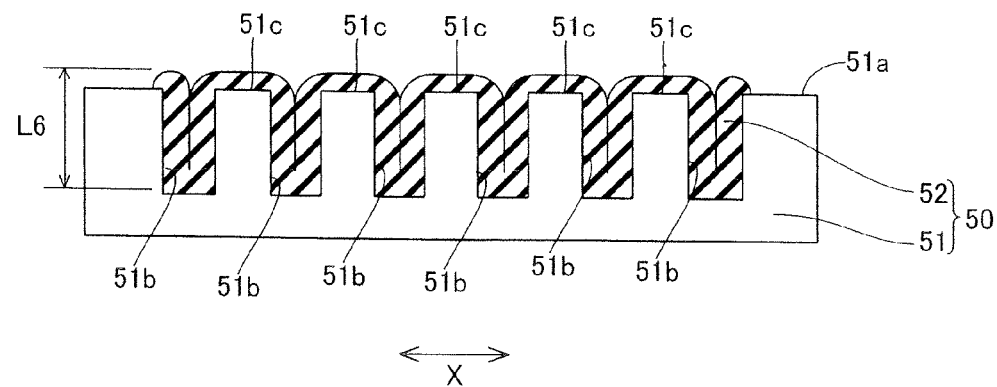

As shown in FIG. 8, a resist pattern is formed on the main surface 51a of the silicon substrate 51 (see FIG. 7) by photolithography and thereafter the resists are employed as masks for etching the silicon substrate 51 by a vapor phase method or a liquid phase method. Then the resist is removed and washed to form the grooves 51b. As shown in FIG. 9, the electret film 52 (HDP-SiO$_2$ film) is formed by plasma CVD and thereafter the resist pattern are formed and etched again, whereby the electret film 52 is processed to have a prescribed shape. Then charges are injected into the electret film 52 by corona discharge, thereby forming the electret device 50.

According to the third embodiment, as hereinabove described, the electret film 52 can be so formed as to fill up the grooves 51b of the silicon substrate 51 also when the electret film 52 (HDP-SiO$_2$ film) is formed by plasma CVD. Thus, the thickness of the electret film 52 can be partially increased and hence the volume per unit plane area of the electret film 52 can be increased.

The remaining effects of the third embodiment are similar to those of the aforementioned first and second embodiments.

Fourth Embodiment

Figure 10:
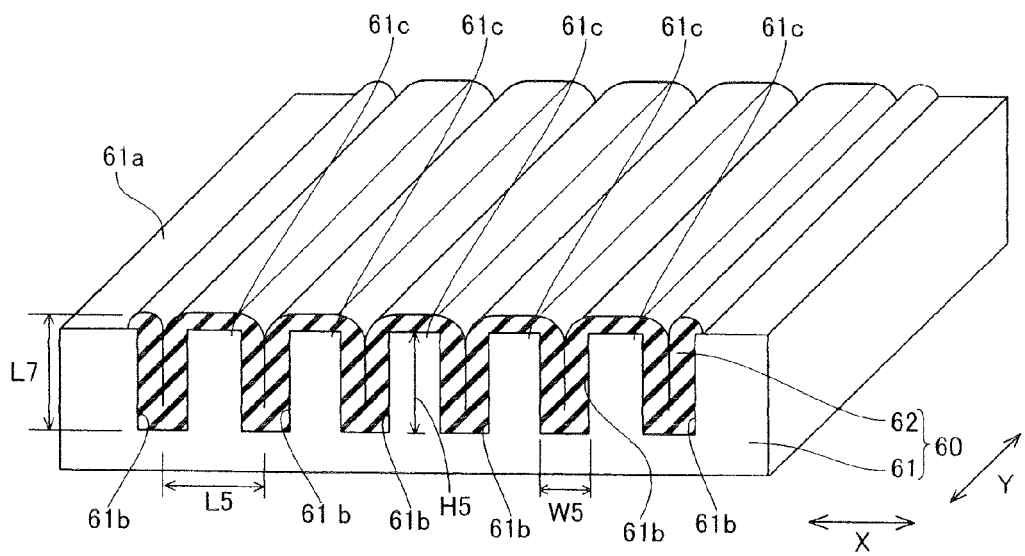
FIG. 10 is a perspective view showing a structure of an electret device according to a fourth embodiment of the present invention.

Referring to FIG. 10, in an electret device according to a fourth embodiment, an electret film of a fluorinated material is formed by application, dissimilarly to the electret device formed with the electret film of the inorganic material other than thermal silicon oxide by plasma CVD according to the third embodiment. More specifically, according to the fourth embodiment, an electret film 62 of CYTOP (by Asahi Glass Co., Ltd.) (BEV (4-vinyloxy-1-butene) copolymer) as the exemplary fluorinated material is formed.

As shown in FIG. 10, an electret device 60 according to the fourth embodiment is constituted by a silicon substrate 61 and the electret film 62 of CYTOP capable of storing negative charges formed by application.

The silicon substrate 61 and the remaining structure according to the fourth embodiment are similar to the silicon substrate and the remaining structure according to the third embodiment.

A manufacturing process of the electret device 60 according to the fourth embodiment of the present invention will be now described with reference to FIGS. 10 to 12.

Figure 11:
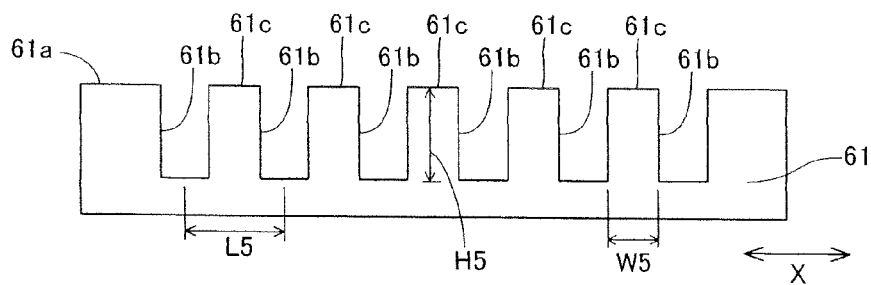
FIGS. 11 and 12 are sectional views for illustrating a process of manufacturing the electret device according to the fourth embodiment of the present invention.
Figure 12:
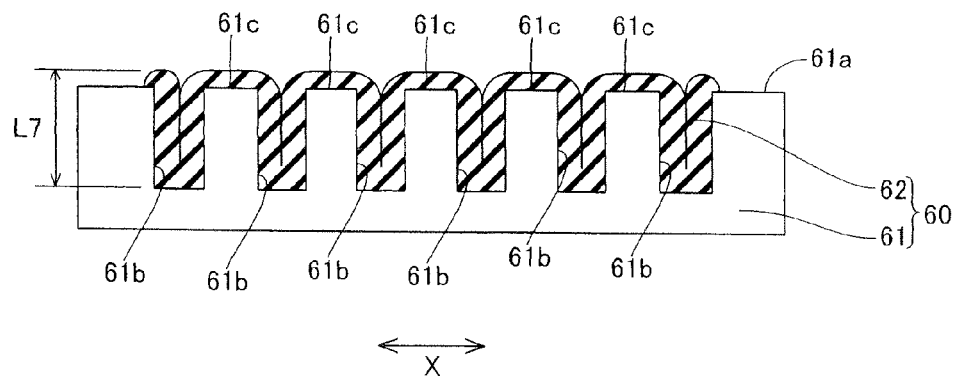

As shown in FIG. 11, grooves 61b and projection shaped portions 61c are formed on a main surface 61a of the silicon substrate 61 through steps similar to those of the third embodiment. Then the electret film 62 of CYTOP having a thickness of about 3 µm by spin coating is formed as shown in FIG. 12. A resist pattern is formed and etched again, whereby the electret film 62 is processed to have a prescribed shape. Then charges are injected into the electret film 62 by corona discharge, thereby forming the electret device 60.

According to the fourth embodiment, as hereinabove described, the electret film 62 can be so formed as to fill up the grooves 61b of the silicon substrate 61 also when the electret film (CYTOP film) 62 of the fluorinated material is formed by application. Thus, the thickness of the electret film 62 can be partially increased and hence the volume per unit plane area of the electret film can be increased.

The remaining effects of the fourth embodiment are similar to those of the aforementioned first to third embodiments.

Fifth Embodiment

Figure 13:
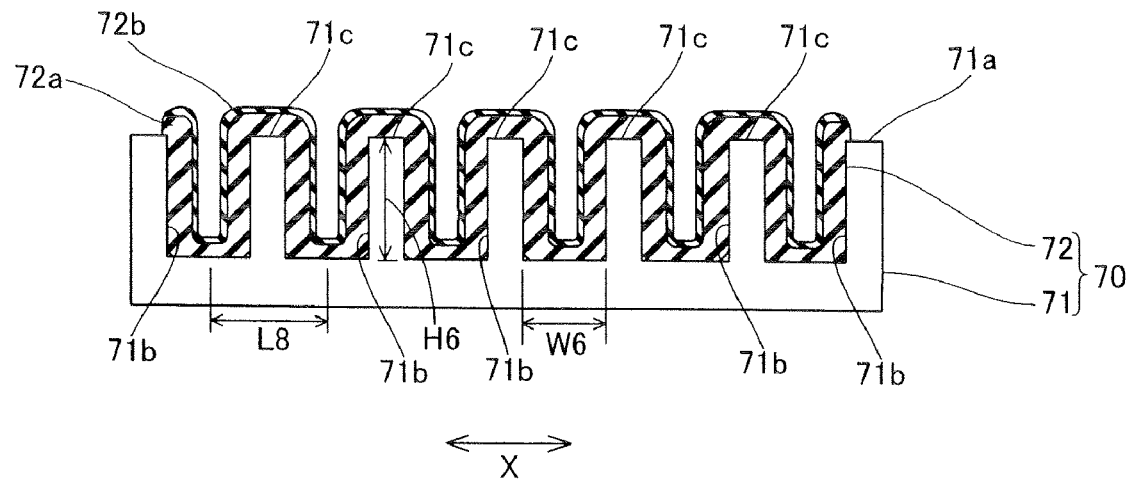
FIG. 13 is a sectional view showing a structure of an electret device according to a fifth embodiment of the present invention.

Referring to FIG. 13, in an electret device according to a fifth embodiment, an electret film obtained by stacking a plurality of layers is formed dissimilarly to the electret device according to each of the aforementioned first to fourth embodiments.

An electret device 70 according to the fifth embodiment is constituted by a silicon substrate 71 and the electret film 72 formed by stacking the plurality of layers capable of storing negative charges formed as shown in FIG. 13.

A plurality of grooves 71b each having a depth H6 of about 6 µm and a width W6 of about 3 µm are formed on the silicon substrate 71 at prescribed intervals (distance between centers) L8 (about 10 µm, for example). The first electret film 72a of HDP-SiO$_2$ having a thickness of about 1 µm is so formed on a main surface 71a of the silicon substrate 71 as to cover inner surfaces of the grooves 71b and projection shaped portions 71c between the grooves 71b, and a second electret film 72b of organic SOG having a thickness of about 0.3 µm is so formed as to cover a surface of the first electret film 72a. Thus, the electret film 72 consisting of two layers is so formed as to cover the silicon substrate 71.

The substrate and the remaining structure of the electret device according to the fifth embodiment are similar to the substrate and the remaining structure of the electret device according to each of the first to fourth embodiments.

A manufacturing process of the electret device 70 according to the fifth embodiment of the present invention will be now described with reference to FIG. 13.

The grooves 71b are formed on the main surface 71a of the silicon substrate 71 through steps similar to those of the fourth embodiment. Then the first electret film 72a of HDP-SiO$_2$ having a thickness of about 1 µm is formed by plasma CVD. The second electret film 72b of organic SOG having a thickness of about 0.3 1 µm is formed on the surface of the first electret film 72a by spin coating. A resist pattern is formed and etched again, whereby the electret film 72 is processed to have a prescribed shape. Then charges are injected into the electret film 72 by corona discharge, thereby forming the electret device 70.

According to the fifth embodiment, as hereinabove described, the electret film 72 can be so formed as to cover the inner surfaces of the grooves 71b of the silicon substrate 71 also when the electret film 72 obtained by staking the two layers of the first electret film 72a and the second electret film 72b is formed on the main surface 71a of the silicon substrate 71.

Thus, the electret film 72 can be formed not only from bottom surface portions of the grooves 71b in a direction perpendicular to the main surface 71a of the silicon substrate 71 but also from inner side surface portions of the grooves 71b in a horizontal direction with respect to the main surface 71a of the silicon substrate 71, and hence the surface area (volume) per unit plane area of the electret film 72 can be increased.

The remaining effects of the fifth embodiment are similar to those of the aforementioned first to fourth embodiments.

Sixth Embodiment

An electrostatic induction generator 100 including electret device 133 according to the aforementioned first embodiment, according to a sixth embodiment will be described with reference to FIGS. 14 to 18. The sixth embodiment of the present invention is applied to the electrostatic induction generator 100 which is an exemplary electrostatic operating apparatus.

Figure 14:
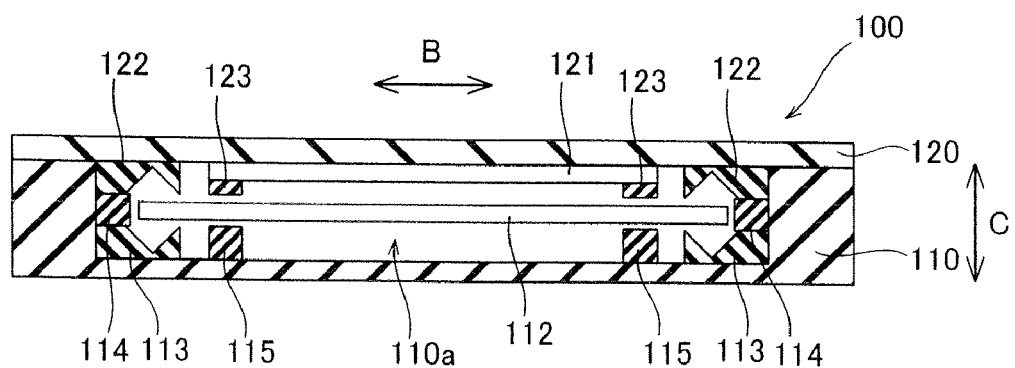
FIG. 14 is a sectional view showing a structure of an electrostatic induction generator according to a sixth embodiment of the present invention.

The electrostatic induction generator 100 according to the sixth embodiment comprises a lower housing 110 formed with a storage portion 110a and an upper housing 120 so mounted on an upper surface of the lower housing 110 as to close the storage portion 110a, as shown in FIG. 14. A load 200 (see FIG. 16) driven by the electrostatic induction generator 100 is connected to the electrostatic induction generator 100.

Figure 15:
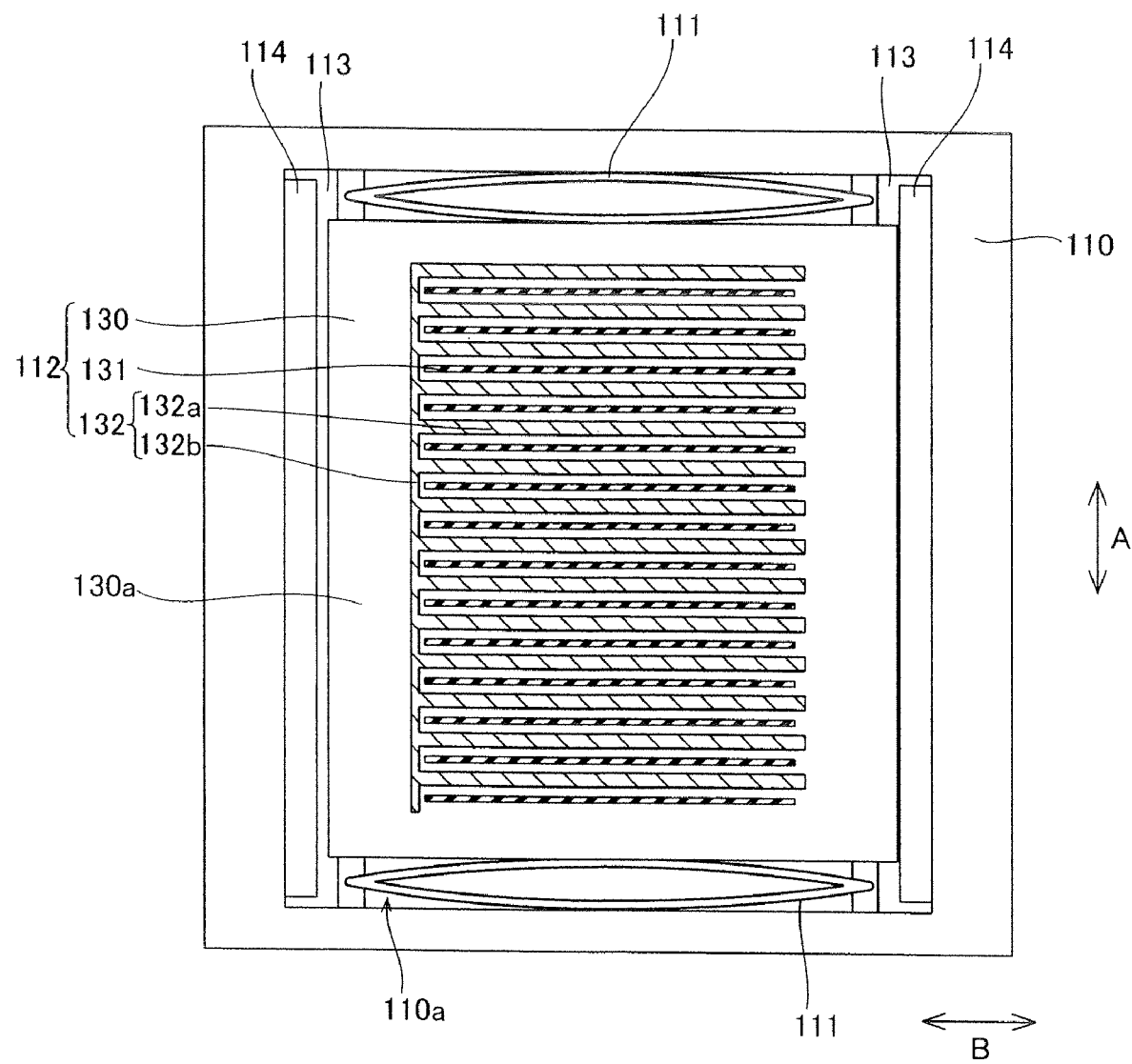
FIG. 15 is a plan view showing a structure of a lower housing of the electrostatic induction generator according to the sixth embodiment.

As shown in FIGS. 14 and 15, a pair of spring members 111 (see FIG. 15), a movable substrate 112 so formed as to be movable along arrow A (see FIG. 15) with the pair of spring members 111, guide portions 113 for guiding the movable substrate 112, and spacers 114 and 115 (see FIG. 14) for regulating a position of the movable substrate 112 are provided in the storage portion 110a of the lower housing 110 of the electrostatic induction generator 100. The spring members 111 are arranged between inner surfaces along arrow A of the storage portion 110a and the movable substrate 112. The guide portions 113 and the spacers 114 are so provided along inner surfaces along arrow B of the storage portion 110a as to extend along arrow A. The guide portions 113 are provided on bottom surface of the storage portion 110a. The spacers 114 each have a function of regulating a position along arrow B of the movable substrate 112 and are provided on the guide portions 113. The spacers 115 each have a function of regulating a position along arrow C (see FIG. 14) of the movable substrate 112.

As shown in FIG. 14, the upper housing 120 of the electrostatic induction generator 100 includes a fixed substrate 121 made of glass so provided as to be opposed to the movable substrate 112 and guide portions 122 for guiding the movable substrate 112. The fixed substrate 121 is provided with spacers 123 each having a function of regulating a position along arrow C of the movable substrate 112 on regions corresponding to the spacers 115. Thus, the movable substrate 112 and the fixed substrate 121 are arranged at a prescribed interval. The guide portions 122 are provide along inner surfaces along arrow B of the storage portion 110a to extend along arrow A so as to be opposed to the guide portions 113 with the movable substrate 112 therebetween.

Figure 16:
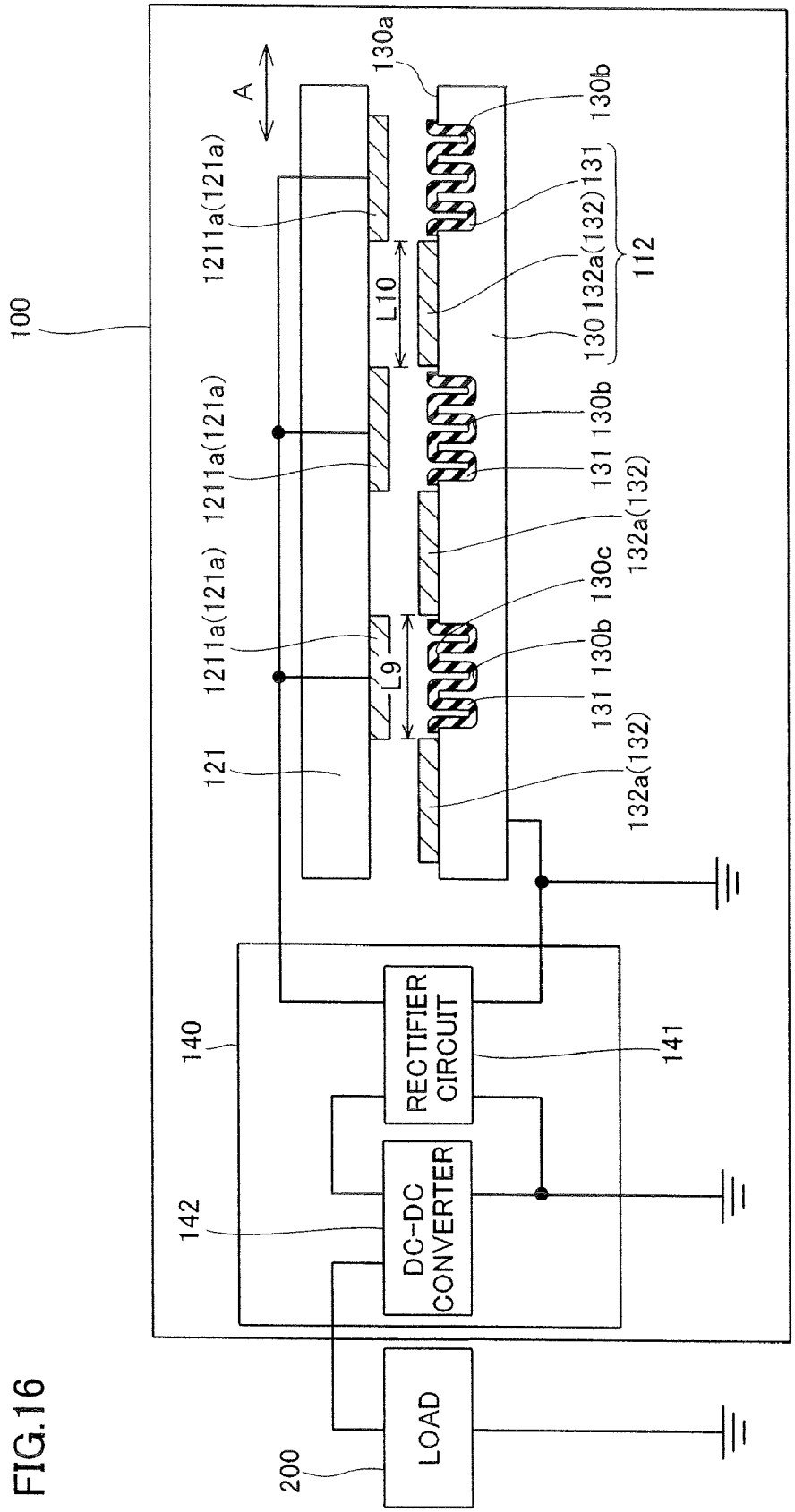
FIG. 16 is a schematic diagram showing the structure of the electrostatic induction generator according to the sixth embodiment.
Figure 17:
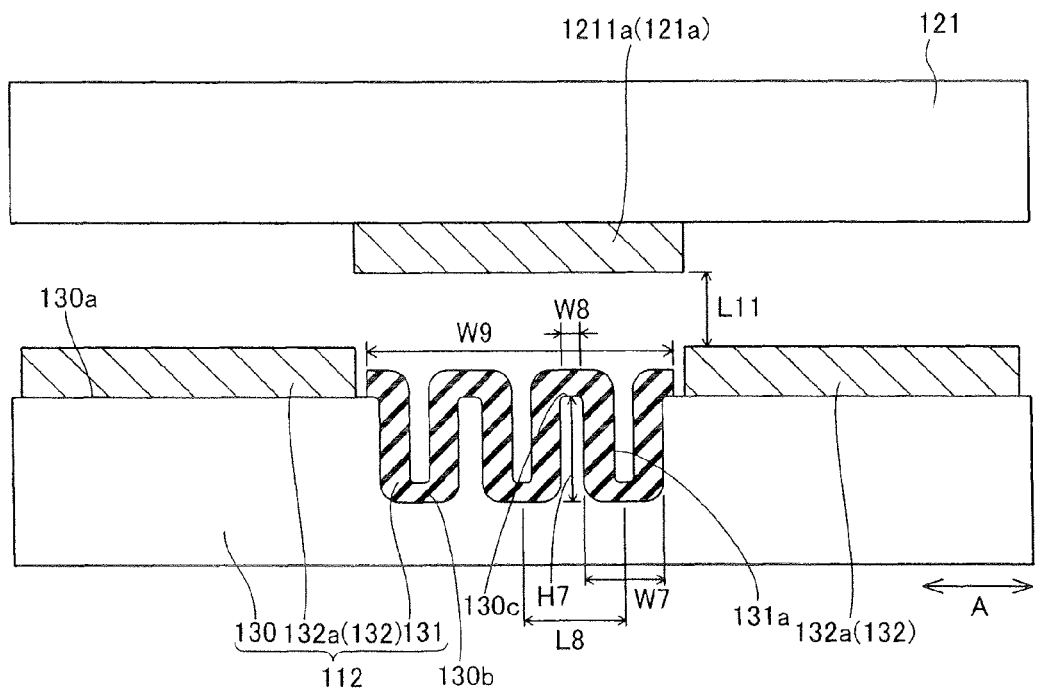
FIG. 17 is an enlarged view showing the structure of the electrostatic induction generator according to the sixth embodiment.

According to the sixth embodiment, the movable substrate 112 of the lower housing 110 is constituted by a conductive silicon substrate 130, electret films 131 of silicon oxide by thermal oxidation capable of storing negative charges, and a guard electrode 132 of Al, as shown in FIGS. 15 to 17. As shown in FIG. 17, a plurality of grooves 130b are formed between after-mentioned comb portions 132a of the guard electrode 132 on a main surface 130a closer to the fixed substrate 121 of the silicon substrate 130 at prescribed intervals (distance between centers) L8 (about 10 µm, for example) along arrow X. The grooves 130b are examples of the "recess portion" in the present invention. The grooves 130b each are so formed as to have a depth H7 of about 15 µm and the width W7 of about 8 µm and extend along arrow B (see FIG. 15). Thus, projection shaped portions 130c each having a width W8 of about 2 µm are so formed as to protrude from bottom surfaces of the grooves 130b between the adjacent grooves 130b. The projection shaped portions 130c are examples of the "projecting portions" in the present invention. The electret films 131 of silicon oxide by thermal oxidation each having a thickness of about 2 µm are so formed on the main surface 130a of the silicon substrate 130 as to cover inner surfaces of the grooves 130b and surfaces of the projection shaped portions 130c between the grooves 130b. The electret films 131 of silicon oxide by thermal oxidation each are formed between the comb portions 132a to have a width W9 of about 80 µm. The electret films 131 of silicon oxide by thermal oxidation are so formed as to reflect shapes of the grooves 130b and the projection shaped portions 130c. In other words, portions formed inside the grooves 130b of the electret films 131 of silicon oxide by thermal oxidation are so formed as to have groove shaped portions 131a. The groove shaped portions 131a each are so formed as to have a depth of about 15 µm and a width of about 4 µm and extend along arrow B. The electret device 133 is constituted by the silicon substrate 130 and the electret films 131.

Figure 18:
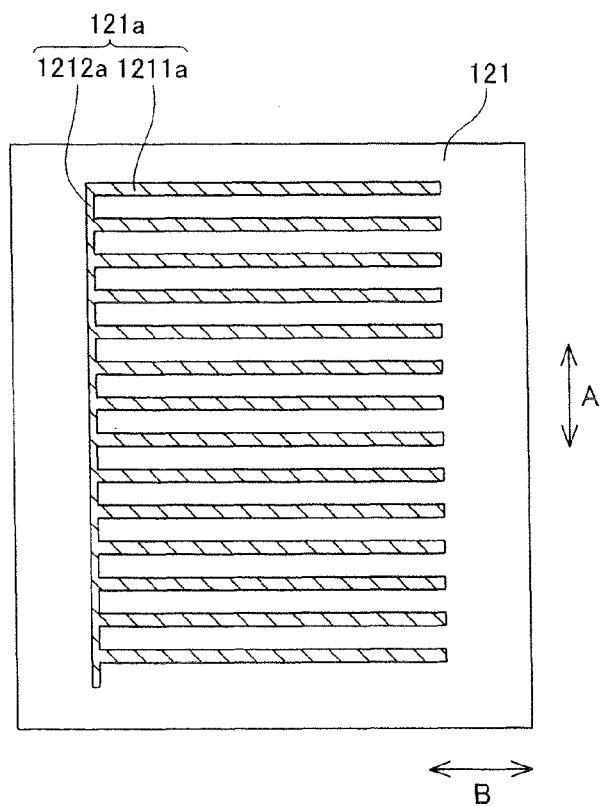
FIG. 18 is a plan view showing a fixed substrate of the electrostatic induction generator according to the sixth embodiment.

According to the sixth embodiment, the comb-like guard electrode 132 having a plurality of the comb portions 132a extending along arrow B and a coupling portion 132b extending along arrow A are provided on the main surface 130a closer to the fixed substrate 121 of the silicon substrate 130, as shown in FIG. 15. The plurality of comb portions 132a of the guard electrode 132 are provided along arrow A at prescribed intervals L9 (about 100 µm, for example), as shown in FIG. 16. The comb portions 132a each have a thickness of about 5 µm and a width of about 100 µm. A comb-like collector 121a having a plurality of comb portions 1211a of Al extending along arrow B and a coupling portion 1212a extending along arrow A is provided on a surface closer to the silicon substrate 130 of the fixed substrate 121 as shown in FIG. 18. A plurality of the comb portions 1211a of the collector 121a are provided along arrow A at prescribed intervals L7 (about 100 µm, for example), as shown in FIG. 16. The comb portions 1211a each have a thickness of about 5 µm and a width of about 100 µm. The comb portions 1211a of the collector 121a and the comb portions 132a of the guard electrode 132 are so formed as to be arranged at a prescribed interval L11 of about 30 µm, as shown in FIG. 17. The collector 121a is an example of the "electrode" in the present invention.

The collector 121a and the silicon substrate 130 are connected to a circuit portion 40 as shown in FIG. 16. This circuit portion 40 includes a rectifier circuit 141 for rectifying power generated, a DC-DC converter 142 for converting a voltage level of a direct current rectified with the rectifier circuit 141. The rectifier circuit 141 is connected to the collector 121a and the silicon substrate 130 and also connected to the DC-DC converter 142. The load 200 driven through power generated with the electrostatic induction generator 100 is connected to the DC-DC converter 142. The silicon substrate 130, the DC-DC converter 142 and the load 200 are grounded.

Figure 19:
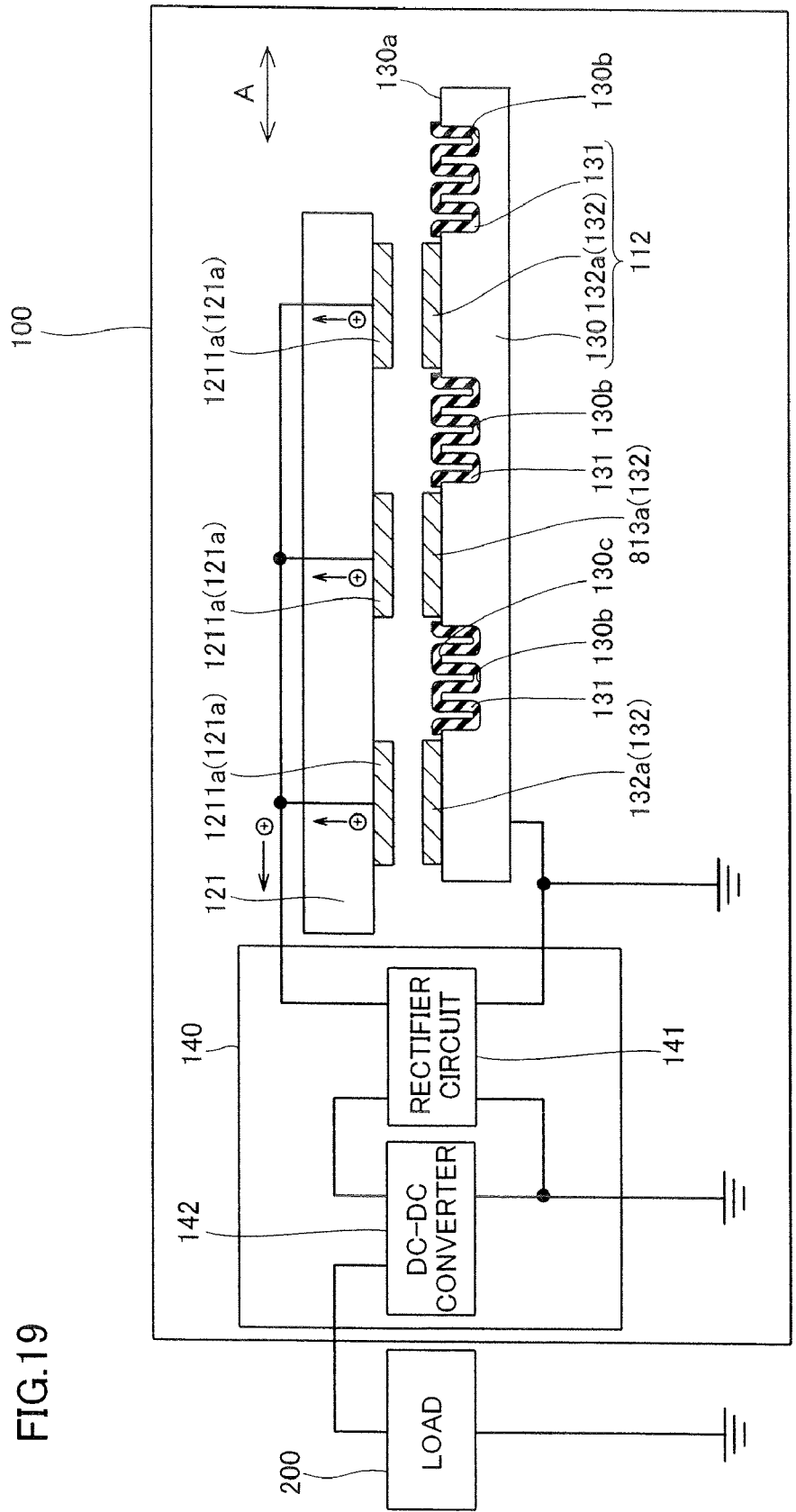
FIG. 19 is a diagram for illustrating a power generating operation of the electrostatic induction generator according to the sixth embodiment of the present invention.

A power generating operation of the electrostatic induction generator 100 according to the sixth embodiment of the present invention will be now descried with reference to FIGS. 16 and 19.

When vibration is not applied to the electrostatic induction generator 100, the electret films 131 and the comb portions 1211a of the collector 121a are so arranged as to be opposed to each other at the interval L11 (see FIG. 17) of about 30 µm as shown in FIG. 16, and hence positive charges are stored in the comb portions 1211a of the collector 121a by electrostatic induction.

As shown in FIG. 19, the movable electrodes 112 (silicon substrate 130) moves in a direction A resulting from vibration applied to the electrostatic induction generator 100 in a horizontal direction (direction A), whereby the comb portions 132a of the guard electrode 132 move to positions opposed to the comb portions 1211a of the collector 121a. Thus, the potential of a region opposed to each comb portion 1211a of the collector 121a is changed from a low potential to a high potential, and hence the amount of positive charges stored in the comb portions 1211a of the collector 121a by electrostatic induction is changed (reduced). This changed positive charges become current, which is outputted to the load 200 through the rectifier circuit 141 and the DC-DC converter 142. The movable electrode 112 (silicon substrate 130) repeats the aforementioned operation by vibration in the direction A, whereby power is continuously generated.

A manufacturing process of the movable substrate 112 according to the sixth embodiment of the present invention will be now described with reference to FIGS. 16, 17 and 20 to 24.

Figure 20:
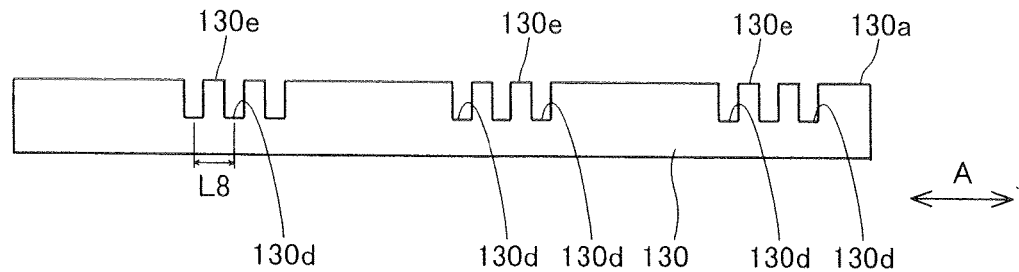
FIGS. 20 to 23 are sectional views for illustrating a process of manufacturing a movable substrate of the electrostatic induction generator according to the sixth embodiment of the present invention.
Figure 21:
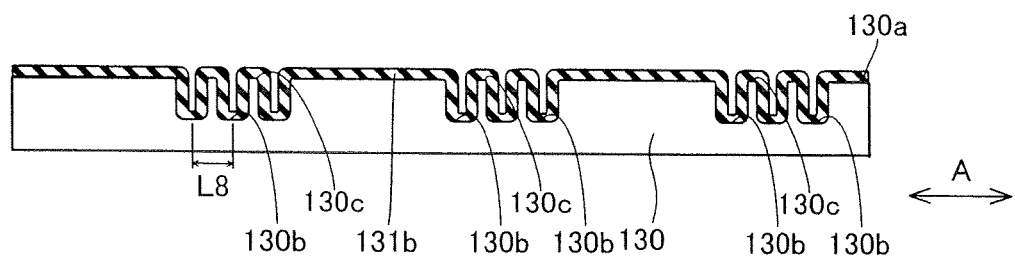

As shown in FIG. 20, a plurality of grooves 130d are formed on the main surface 130a of the silicon substrate 130 by photolithography and etching at the prescribed intervals (distance between centers) L8 (about 10 μm, for example) along arrow A. These grooves 130d each have a depth of about 15 μm and a width of about 6 μm. Thus, projection shaped portions 130e each having a width of about 4 μm are formed between the adjacent grooves 130d. The plurality of grooves 130d are formed along arrow A at every interval of about 100 μm. As shown in FIG. 21, the inner surfaces of the grooves 130d of the silicon substrate 130 and upper surfaces of the projection shaped portions 130e between the grooves 130d are thermally oxidized by thermal oxidation, thereby forming a silicon oxide film 131b having a thickness of about 2 μm.

This thermal oxidation is performed by thermal treatment at about 1000° C. for 15 hours in an atmosphere containing hydrogen gas, nitrogen gas and oxygen gas. Thus, the grooves 130b (see FIG. 17) each having the width W7 (about 8 μm) larger than that of each groove 130d shown in FIG. 20 are formed and the projection shaped portions 130c (see FIG. 17) each having a width W8 (about 2 μm) smaller than that of each projection shaped portion 130e shown in FIG. 20 are formed. Thereafter silicon oxide films 131b each having the width W9 of about 80 μm shown in FIG. 22 are formed by photolithography and etching.

Figure 23:
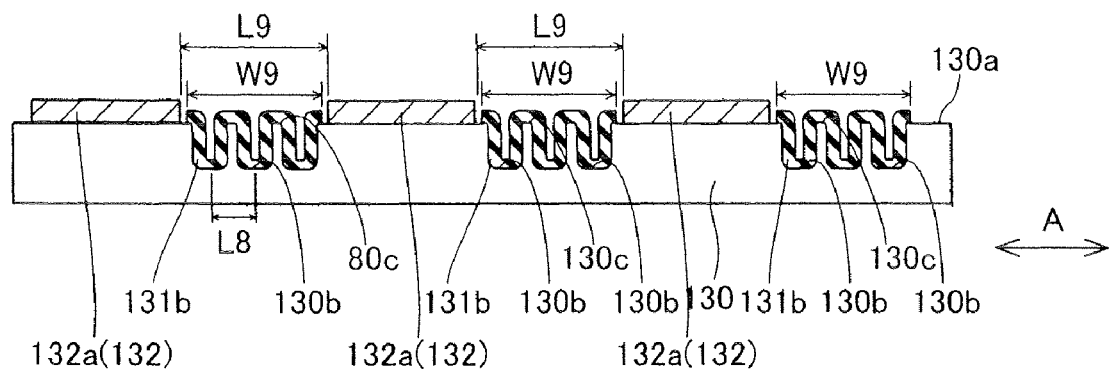
Figure 24:
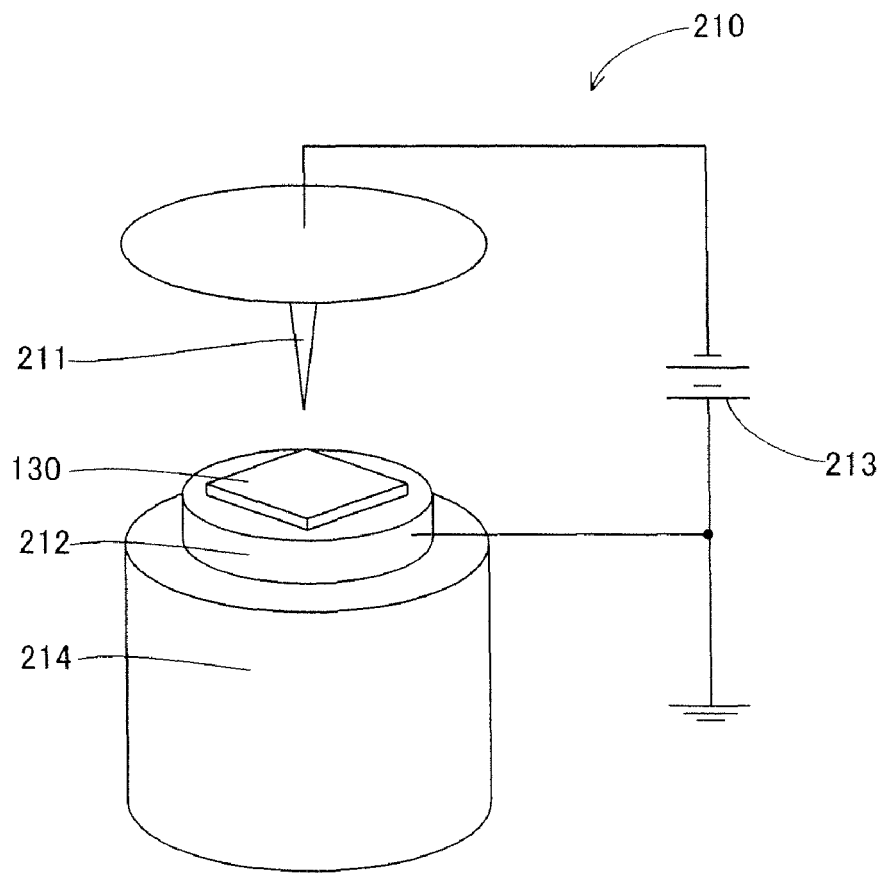
FIG. 24 is a diagram for illustrating the process of manufacturing the movable substrate of the electrostatic induction generator according to the sixth embodiment of the present invention.

As shown in FIG. 23, the guard electrode 132 of Al is formed on the main surface 130a of the silicon substrate 130 between the silicon oxide films 131b. More specifically, after forming an electrode layer, the comb portions 132a of the guard electrode 132 are formed along arrow A at the prescribed intervals L9 (about 100 μm, for example) by photolithography and etching. The comb portions 132a of the guard electrode 132 each have a width of about 100 μm and a thickness of about 5 μm.

Figure 22:
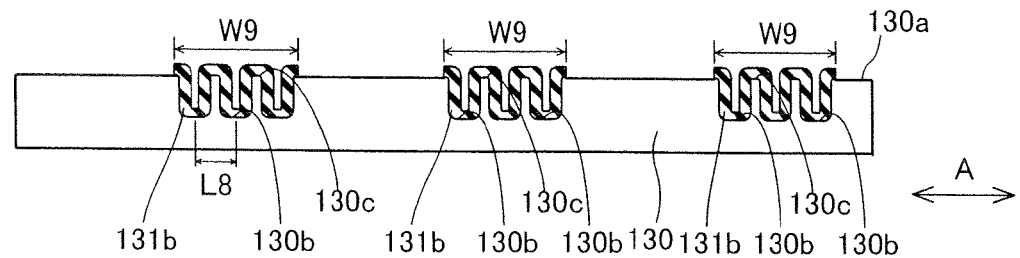

As shown in FIG. 22, charges are injected into the silicon oxide films 131b with charge injection apparatus 210. This charge injection apparatus 210 comprises a needle electrode 211 for generating corona discharge, an electrode plate 212 for arranging the silicon substrate 130 on a region opposed to the needle electrode 211, a power supply 213 for applying a high voltage between the needle electrode 211 and the electrode plate 212, and a hot plate 214 for heating the silicon substrate 130 arranged on the electrode plate 212. Charges are injected into the silicon oxide films 131b under a condition of an applied voltage of 10 kV (current: 0.07 mA to 0.50 mA), and a heating temperature of 80° C. to 90° C. for one minute. Thus, the movable substrate 112 constituted by the silicon substrate 130, the electret films 131 and the guard electrode 132 as shown in FIG. 16 is formed.

According to the sixth embodiment, as hereinabove described, the electret device 133 including the electret films 131 of silicon oxide so formed as to cover the inner surfaces of the grooves 130b of the silicon substrate 130 is provided, whereby the electret device 133 having a large surface potential can be employed and hence power generation efficiency of the electrostatic induction generator 100 can be improved.

Although the present invention has been described and illustrated in detail, it is clearly understood that the same is by way of illustration and example only and is not to be taken by way of limitation, the spirit and scope of the present invention being limited only by the terms of the appended claims.

For example, while the electret film storing negative charges is formed in each of the aforementioned first to sixth embodiments, the present invention is not restricted to this but an electret film storing positive charges may be alternatively formed.

While the grooves have the same intervals, widths, and depths in each of the aforementioned first to sixth embodiments, the present invention is not restricted to this but grooves may alternatively have various intervals, widths, and depths.

While the electret device is constituted by the silicon substrate in each of the aforementioned first to sixth embodiments, the present invention is not restricted to this but a substrate may be formed by a material other than the silicon substrate. In this case, the substrate may be alternatively formed by silica glass ceramics, fluororesin and insulating resin, for example.

While the holes have the same intervals, diameters, and depths in each of the aforementioned modifications of the first and second embodiments, the present invention is not restricted to this but holes may alternatively have various intervals, diameters, and depths.

While the circular holes in plan view are formed in each of the aforementioned modifications of the first and second embodiments, the present invention is not restricted to this but polygonal holes in plan view such as square holes in plan view may be alternatively formed.

While the electret film 52 of HDP-$SiO_2$ by plasma CVD is formed as an exemplary electret film of the inorganic material other than the silicon oxide film by thermal oxidation in the third embodiment, the present invention is not restricted to this but the electret film 52 may be alternatively formed by the inorganic material other than HDP-$SiO_2$. In the case, the electret film may be alternatively formed by TEOS (tetraethoxysilane) by plasma CVD, Si oxide by sputtering, Si nitride by sputtering, as a silicon-based material, for example. In a case of employing a metal oxide film as the electret film, it may be formed by $MgTiO_3$ (magnesium titanate), $BaTiO_3$ (barium titanate), $CaTiO_3$ (calcium titanate), $Al_2O_3$ (aluminum oxide) or the like.

While the electret film 62 of CYTOP (by Asahi Glass Co., Ltd.) (BEV (4-vinyloxy-1-butene) copolymer) by application is formed as an exemplary electret film by the fluorinated material in the fourth embodiment, the present invention is not restricted to this but the electret film may be alternatively formed by the fluorinated material other than CYTOP. In this case, the electret film may be formed by PTFE (polytetrafluoroethylene), PFA (copolymer of tetrafluoroethylene and perfluoro alkylvinyl ether), FEP (copolymer of tetrafluoroethylene and hexafluoropropylene (4•6 fluoride)), ETFE (copolymer of tetrafluoroethylene and ethylene), PVDF (polyvinylidene-fluoride (2 fluoride)), PCTFE (polychlorotrifluoroethylene (3 fluoride)), ECTFE (ethylene-chloro trifluoro ethylene copolymer), PVF (Poly vinyl fluoride (polyvinyl chloride)), FEP-Teflon (copolymer of tetrafluoroethylene and hexapropylen), or the like, for example.

While the electret film 62 is formed by the fluorinated material in the fourth embodiment, the present invention is not restricted to this but the electret film may be alternatively formed by an organic material. Steps of forming the electret film of the organic material are similar to those of forming the electret film 62 by the fluorinated material according to the fourth embodiment. For example, the electret film can be formed by PP (polypropylene), PET (polyethylene terephthalate), PVC (polyvinyl chloride), PS (polystyrene) or the like as the exemplary organic material.

While the electret film fills up the grooves formed on the main surface of the silicon substrate in each of the third and fourth embodiments similarly to the second embodiments, the present invention is not restricted to this but portions formed in the grooves of the silicon substrate in the electret film may be so formed as to have groove shaped portions (see FIG. 1) along grooves similarly to the first embodiment.

While the portions of the electret film 72 formed in the grooves 71b of the silicon substrate 71 may be so formed as to have groove shaped portions in the fifth embodiment similarly to the first embodiment, the present invention is not restricted to this but the electret film 72 may be so formed as to fill up the grooves 71 (see FIG. 4) similarly to the second to fourth embodiments.

While the grooves are formed on the main surface of the silicon substrate in each of the third to fifth embodiments similarly to the first and second embodiments, the present invention is not restricted to this but holes may be alternatively formed on the main surface of the silicon substrate similarly to the modifications of the first and second embodiment.

While the electrostatic induction generator 100 as an exemplary electrostatic induction conversion device is shown in the aforementioned sixth embodiment, the present invention is not restricted to this but the present invention is also applicable to other electrostatic operating apparatus such as an actuator of an electrostatic induction type so far as the electrostatic operating apparatus includes an electret device.

While the grooves 130b are formed on the silicon substrate 130 in the aforementioned sixth embodiment, the present invention is not restricted to this but holes may be alternatively formed on the silicon substrate.

While the electret films 131 reflecting shapes of the grooves 130b and the projection shaped portions 130c of the silicon substrate 130 are formed in the aforementioned sixth embodiment, the present invention is not restricted to this but the electret films may be alternatively so formed as to fill up the grooves of the silicon substrate.

While the collector 121a is formed in the form of a comb and the electret films 131 are formed between the comb portions 132a of the guard electrode 132 in the aforementioned sixth embodiment, the present invention is not restricted to this but other shape may be applicable so far as the collector and the electret films are formed such that the opposing areas are changed by vibration.

While the collector 121a is formed on the fixed substrate 121 and the silicon substrate 130, the electret films 131 and the guard electrode 132 constituting the movable substrate 112 are provided in the aforementioned sixth embodiment, the present invention is not restricted to this but a silicon substrate, electret films, and a guard electrode constituting a fixed substrate may be provided and a collector electrode may be formed on a movable substrate.

While the interval L9 of each comb portion 132a of the guard electrode 132 is the same as the width of each comb portion 1211a of the collector 121a in the aforementioned sixth embodiment, the present invention is not restricted to this but the intervals of each comb portion of a guard electrode may be smaller than the width of each comb portion of a collector.

While the interval L10 of each comb portion 1211a of the collector 121a is the same as the width of each comb portion 132a of the guard electrode 132 in the aforementioned sixth embodiment, the present invention is not restricted to this but the interval of each comb portion of a collector is smaller than the width of each comb portion of a guard electrode.

While the circuit portion 140 including the rectifier circuit 141 and the DC-DC converter 142 is provided in the aforementioned sixth embodiment, the present invention is not restricted to this but a circuit portion constituted by only a rectifier circuit may be alternatively provided or a circuit portion constituted by only a DC-DC converter may be alternatively provided.

While the fixed substrate 121 made of glass is employed in the aforementioned sixth embodiment, the present invention is not restricted to this but a fixed substrate constituted by silicon or other material may be alternatively employed.

While the electret film 72 consisting of the two layer is formed in the aforementioned fifth embodiment, the present invention is not restricted to this but an electret film consisting of two or more layers may be alternatively formed. In a case of forming three or more layers, a layer constituted by a film other than the electret film such as a barrier film may be employed for example so far as the electret film is formed by at least two layers.

While negative charges generated by corona discharge are injected into the silicon oxide film in each of the aforementioned first to sixth embodiments, the present invention is not restricted to this but negative charges may be injected into the silicon oxide film by applying electron beam to the silicon oxide film.

While the depth of each recess portion of the silicon substrate is larger than the distance between opposed the inner surfaces of the recess portions in each of the aforementioned first to sixth embodiments, the present invention is not restricted to this but the depth of each recess portion may be equal to the distance between the opposed inner surfaces of the recess portions.

What is claimed is:

1. An electret device comprising:
   a first substrate formed with a plurality of recess portions on a main surface thereof;
   a second substrate arranged so as to be opposed to said first substrate; and
   a plurality of electret films so formed on said main surface of said first substrate as to directly cover at least inner surfaces of said recess portions,
   wherein said first substrate and said second substrate are relatively movable with each other along a direction intersecting with a direction that said first substrate and said second substrate are opposed to each other,
   one of said first substrate and said second substrate and the other of said first substrate and said second substrate constitute a movable substrate and a fixed substrate in an electrostatic induction generator, respectively, and wherein
   said plurality of said electrets films are formed at prescribed intervals along a direction that said first substrate and said second substrate relatively move; and
   a plurality of electrodes are formed on the main surface of said first substrate, between the prescribed intervals of electret films.

2. The electret device according to claim 1, wherein the depth of each of said recess portions of said substrate is larger than the thickness of said electret film.

3. The electret device according to claim 1, wherein the depth of each of said recess portions of said substrate is larger than the distance between opposed said inner surfaces of each of said recess portions.

4. The electret device according to claim 1, wherein said recess portions of said substrate are filled up with said electret film.

5. The electret device according to claim 1, wherein said electret film is formed with recess-shaped portions along said inner surfaces of said recess portions and has spaces in said recess-shaped portions.

6. The electret device according to claim 1, wherein said recess portions of said substrate include a plurality of grooves formed at prescribed intervals.

7. The electret device according to claim 1, wherein said recess portions of said substrate include a plurality of holes.

8. The electret device according to claim 1, wherein said electret film is so formed as to cover not only said inner surfaces of said recess portions but also a surface of a projecting portion located between said recess portions.

9. The electret device according to claim 1, wherein said electret film is formed by stacking a plurality of layers.

10. The electret device according to claim 1, wherein said substrate and said electret film contain silicon.

\* \* \* \* \*